United States Patent
Terwilliger et al.

(10) Patent No.: US 11,111,809 B2
(45) Date of Patent: Sep. 7, 2021

(54) ELECTRIC HEATING FOR TURBOMACHINERY CLEARANCE CONTROL

(71) Applicant: UNITED TECHNOLOGIES CORPORATION, Farmington, CT (US)

(72) Inventors: Neil Terwilliger, Meriden, CT (US); Christopher J. Hanlon, Sturbridge, MA (US); Patrick D Couture, Tolland, CT (US); Coy Bruce Wood, Ellington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 92 days.

(21) Appl. No.: 15/979,085

(22) Filed: May 14, 2018

(65) Prior Publication Data
US 2019/0345835 A1 Nov. 14, 2019

(51) Int. Cl.
*F01D 11/24* (2006.01)
*F01D 25/10* (2006.01)
*F01D 11/18* (2006.01)

(52) U.S. Cl.
CPC .............. *F01D 11/24* (2013.01); *F01D 11/18* (2013.01); *F01D 25/10* (2013.01); *F05D 2240/24* (2013.01); *F05D 2240/55* (2013.01); *F05D 2260/201* (2013.01); *F05D 2270/62* (2013.01)

(58) Field of Classification Search
CPC .......... F01D 11/08; F01D 11/18; F01D 11/24; F01D 25/10; F05D 2240/55; F05D 2260/201
See application file for complete search history.

(56) References Cited

U.S. PATENT DOCUMENTS

| | | | |
|---|---|---|---|
| 4,482,293 A | 11/1984 | Perry | |
| 5,167,487 A * | 12/1992 | Rock | F01D 11/18 415/173.1 |
| 5,181,826 A * | 1/1993 | Rock | F01D 11/18 415/171.1 |

(Continued)

FOREIGN PATENT DOCUMENTS

| | | | |
|---|---|---|---|
| CA | 2558799 A1 * | 3/2007 | ............. F01D 11/24 |
| EP | 2597274 | 5/2013 | |

(Continued)

OTHER PUBLICATIONS

Neil Terwilliger, U.S. Appl. No. 15/979,112, filed May 14, 2018 and entitled "Electric Heating for Turbomachinery Clearance Control Powered by Hybrid Energy Storage System".

(Continued)

*Primary Examiner* — Kenneth Bomberg
*Assistant Examiner* — Christopher R Legendre
(74) *Attorney, Agent, or Firm* — Snell & Wilmer L.L.P.

(57) ABSTRACT

A clearance control system for a gas turbine engine may comprise a rotor blade, an outer structure disposed radially outward from the rotor blade, and a heating element configured to cause the outer structure to be heated in response to electric current being supplied to the heating element, wherein a gap between the rotor blade and the outer structure is at least one of increased, decreased, and maintained in response to the outer structure being heated.

15 Claims, 7 Drawing Sheets

(56) References Cited

U.S. PATENT DOCUMENTS

| | | | | |
|---|---|---|---|---|
| 5,188,506 | A | * | 2/1993 | Creevy ................ F01D 11/005 |
| | | | | 277/643 |
| 5,667,358 | A | * | 9/1997 | Gaul ...................... F01D 11/24 |
| | | | | 415/173.1 |
| 6,896,484 | B2 | * | 5/2005 | Diakunchak ............ F01D 11/18 |
| | | | | 415/173.1 |
| 7,740,443 | B2 | * | 6/2010 | Seitzer .................... F01D 11/24 |
| | | | | 415/116 |
| 8,776,530 | B2 | | 7/2014 | Shirooni |
| 9,353,641 | B2 | | 5/2016 | Snecma |
| 9,890,640 | B2 | | 2/2018 | Vetters |
| 10,132,186 | B2 | * | 11/2018 | Shapiro .................. F01D 11/16 |
| 10,794,214 | B2 | * | 10/2020 | Suciu ...................... F01D 11/24 |
| 2010/0054911 | A1 | | 3/2010 | Wilson et al. |
| 2013/0251500 | A1 | | 9/2013 | Cheung |
| 2014/0314568 | A1 | * | 10/2014 | Vetters ...................... F01D 5/14 |
| | | | | 416/1 |
| 2015/0003958 | A1 | * | 1/2015 | Uskert .................. F01D 25/246 |
| | | | | 415/1 |
| 2015/0369076 | A1 | | 12/2015 | McCaffrey |
| 2018/0054857 | A1 | | 2/2018 | Shuck et al. |
| 2018/0320542 | A1 | * | 11/2018 | Suciu .................... F01D 25/246 |
| 2019/0345835 | A1 | * | 11/2019 | Terwilliger ............. F01D 11/24 |
| 2019/0345836 | A1 | * | 11/2019 | Terwilliger ............. F01D 11/24 |

FOREIGN PATENT DOCUMENTS

| | | |
|---|---|---|
| FR | 2890685 | 3/2007 |
| FR | 2943717 | 10/2010 |
| FR | 2949808 | 3/2011 |
| GB | 2117450 | 10/1983 |
| WO | 2013141938 | 9/2013 |
| WO | 201909909 | 5/2019 |

OTHER PUBLICATIONS

USPTO, Notice of Allowance dated Apr. 29, 2020 in U.S. Appl. No. 15/979,112.

European Patent Office, European Search Report dated Sep. 9, 2019 in Application No. 19174395.4.

European Patent Office, European Search Reort dated Sep. 16, 2019 in Application No. 19174392.1.

USPTO, Restriction/Election Requirement dated Jan. 3, 2020 in U.S. Appl. No. 15/979,112.

European Patent Office, European Office Action dated Jun. 19, 2020 in Application No. 19174395.4.

* cited by examiner

ELECTRIC HEATING FOR TURBOMACHINERY CLEARANCE CONTROL

FIELD

The present disclosure relates to gas turbine engines, and more specifically, to the management of turbomachinery clearances.

BACKGROUND

Gas turbine engines typically include a fan delivering air into a compressor. The air is compressed in the compressor and delivered into a combustion section where it is mixed with fuel and ignited. Products of this combustion pass downstream over turbine blades, driving them to rotate. Turbine rotors, in turn, drive the compressor and fan rotors. The efficiency of the engine is impacted by ensuring that the products of combustion pass in as high a percentage as possible across the turbine blades. Leakage around the blades reduces efficiency. Thus, a blade outer air seal (BOAS) is provided radially outward of the blades to prevent leakage.

The BOAS is spaced from a radially outer part of the blade by a tip clearance. The BOAS is traditionally associated with a carrier element that is mounted to an engine case. Since the blades, the BOAS, and the structure that support the BOAS are different sizes and/or are formed of different materials, they respond to temperature changes in different manners. As these structures expand at different rates in response to temperature changes, the tip clearance may be reduced and the blade may rub on the BOAS, or the tip clearance may increase reducing efficiency, both of which are undesirable.

Clearance control systems are used to control the tip clearance under different operational conditions. Traditional clearance control systems utilize valves and manifolds to direct fan air to specific engine case locations. The cooling air thermally shrinks the engine case at these locations to improve tip clearance and thus fuel burn. However, these manifolds and valves are large, heavy, and expensive. These systems can also be slow to respond and provide limited clearance improvement. By further reducing tip clearances increasing engine efficiency demands can be met.

SUMMARY

In various embodiments, a clearance control system for a gas turbine engine is disclosed, comprising a rotor blade, an outer structure disposed radially outward from the rotor blade, and a heating element configured to cause the outer structure to be heated in response to electric current being supplied to the heating element, wherein a gap between the rotor blade and the outer structure is at least one of increased, decreased, and maintained in response to the outer structure being heated.

In various embodiments, the clearance control system further comprises an electric power supply configured to supply the electric current to the heating element.

In various embodiments, the clearance control system further comprises a controller configured to regulate the electric current being supplied to the heating element.

In various embodiments, the controller regulates the electric current based upon an operating condition of the gas turbine engine.

In various embodiments, the operating condition comprises a throttle position of the gas turbine engine.

In various embodiments, the heating element causes the outer structure to be heated by conductive heating.

In various embodiments, the heating element causes the outer structure to be heated by induction heating.

In various embodiments, the heating element is spaced apart from the outer structure.

In various embodiments, the heating element is coupled to a distal surface of the outer In various embodiments, the heating element is coupled to a proximal surface of the outer structure.

In various embodiments, the heating element is embedded in the outer structure.

A clearance control system for a gas turbine engine is disclosed, comprising a rotor blade, an outer structure disposed radially outward from the rotor blade, and a heating element configured to cause the outer structure to move in a first direction in response to electric current being supplied to the heating element, wherein a gap between the rotor blade and the outer structure is at least one of increased, decreased, and maintained in response to the outer structure being heated.

In various embodiments, the outer structure comprises an outer air seal, and the clearance control system further comprises at least one case support associated with an engine case defining an engine center axis, and a clearance control ring positioned adjacent the at least one case support to form an internal cavity between the engine case and the clearance control ring, and wherein the clearance control ring includes a first mount feature, wherein the outer air seal comprises a second mount feature cooperating with the first mount feature such that the clearance control ring can move independently of the engine case, and wherein, in response to the electric current being supplied to the heating element, the heating element causes the clearance control ring to be heated and, in response to the clearance control ring being heated, the clearance control ring and the outer air seal move together in the first direction with respect to the engine case.

In various embodiments, the clearance control system further comprises an injection nozzle configured to deliver a cooling air flow to the clearance control ring to cause the clearance control ring to move in a second direction.

In various embodiments, the outer structure comprises an engine case defining an engine center axis, and the clearance control system further comprises an outer air seal having a second mount feature coupled to the engine case such that the outer air seal moves with the engine case in response to changes in temperature, wherein, in response to the electric current being supplied to the heating element, the heating element causes the engine case to be heated and, in response to the engine case being heated, the engine case and the outer air seal move together in the first direction with respect to the rotor blade.

In various embodiments, the clearance control system further comprises an injection nozzle configured to deliver a cooling air flow to the engine case to cause the engine case to move in a second direction.

In various embodiments, the clearance control system further comprises an electric power supply configured to supply the electric current to the heating element; and a controller configured to regulated the electric current being supplied to the heating element.

A method for controlling a heating element for a gas turbine engine is disclosed, comprising detecting, by a controller, a condition of an engine, sending, by the controller, electric current to the heating element, and heating, by the heating element, an outer structure to maintain a rotor blade tip clearance gap.

In various embodiments, the detecting the condition of the engine comprises detecting an engine shutdown In various embodiments, the detecting the condition of the engine comprises detecting an increase in throttle of the gas turbine engine.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "distal" refers to the direction radially outward, or generally, away from the axis of rotation of a turbine engine. As used herein, "proximal" refers to a direction radially inward, or generally, towards the axis of rotation of a turbine engine. As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion.

A clearance control system, as provided herein, may be useful gas turbine engines, including for use in the turbine section and/or in the compressor section of the gas turbine engine, and may be useful for any other suitable turbomachinery where rotor blade tip clearance control is desirable.

A clearance control system, as provided herein, may include a heating element for transferring thermal energy to an outer structure to cause the outer structure to thermally grow (e.g., to move in a first radial direction) and a valve assembly for regulating a cooling air flow directed to the outer structure to cause the outer structure to thermally shrink (e.g., to move in a second radial direction). Active bi-directional control of the outer structure in both radial directions may allow for decreased response time (i.e., decrease time for thermal expansion and/or contraction of the outer structure) and faster changes in blade tip clearance. A clearance control system, as provided herein, may allow for tighter tolerances manufactured into the system's components due to increased response time of blade tip clearance control.

Figure 1:
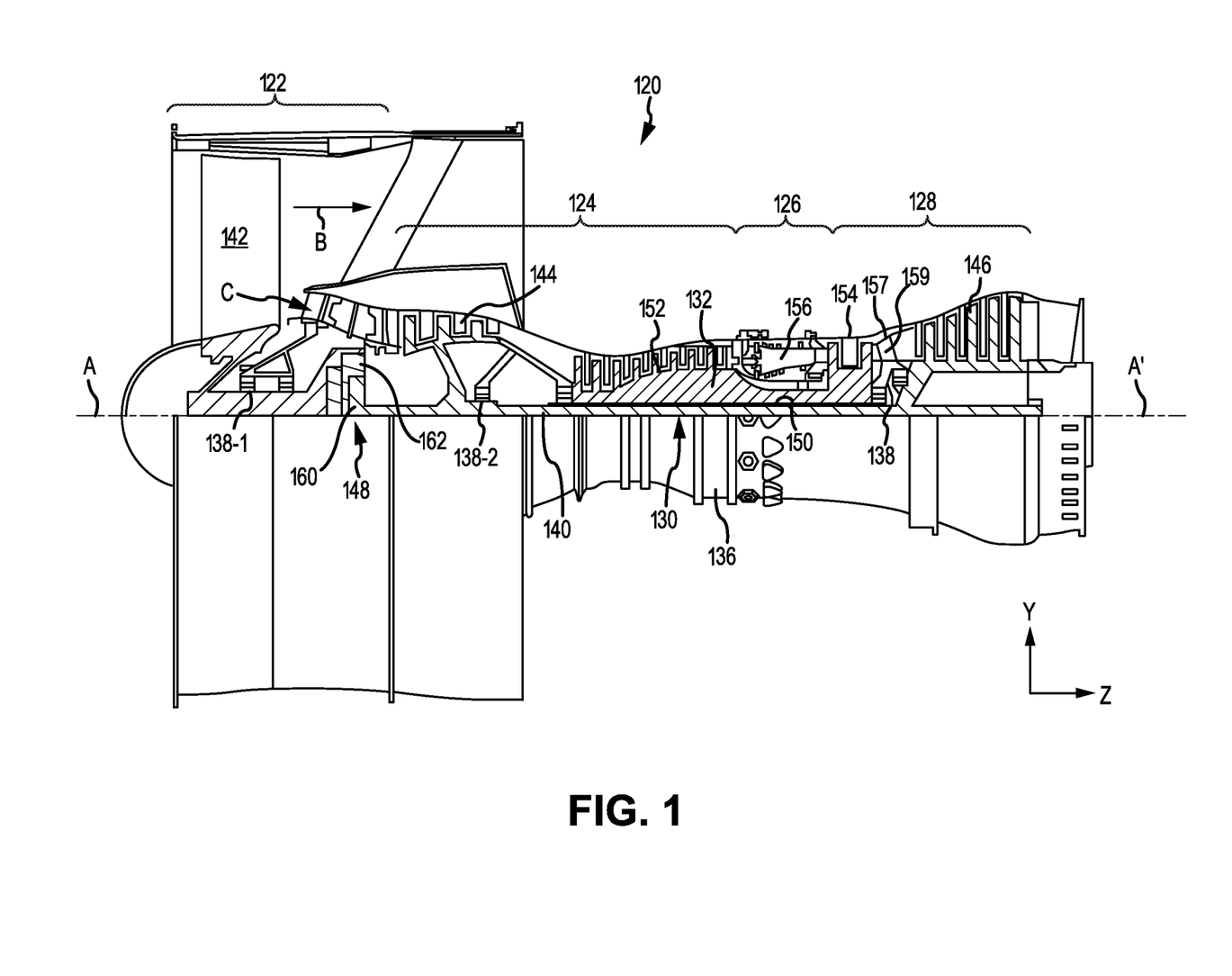
FIG. 1 illustrates a schematic representation of one example of a gas turbine engine, in accordance with various embodiments.

In various embodiments, and with reference to FIG. 1, a gas turbine engine 120 is disclosed. Gas turbine engine 120 may comprise a two-spool turbofan that generally incorporates a fan section 122, a compressor section 124, a combustor section 126, and a turbine section 128. Gas turbine engine 120 may also comprise, for example, an augmenter section, and/or any other suitable system, section, or feature. In operation, fan section 122 may drive air along a bypass flow-path B, while compressor section 124 may further drive air along a core flow-path C for compression and communication into combustor section 126, before expansion through turbine section 128. FIG. 1 provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 120 may comprise a low speed spool 130 and a high speed spool 132 mounted for rotation about an engine central longitudinal axis A-A' relative to an engine static structure 136 via one or more bearing systems 138 (shown as, for example, bearing system 138-1 and bearing system 138-2 in FIG. 1). It should be understood that various bearing systems 138 at various locations may alternatively or additionally be provided, including, for example, bearing system 138, bearing system 138-1, and/or bearing system 138-2.

In various embodiments, low speed spool 130 may comprise an inner shaft 140 that interconnects a fan 142, a low pressure (or a first) compressor section 144, and a low pressure (or a second) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 may couple inner shaft 140 to a rotating fan structure. High speed spool 132 may comprise an outer shaft 150 that interconnects a high pressure compressor ("HPC") 152 (e.g., a second compressor section) and high pressure (or a first) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128. Inner shaft 140 and outer shaft 150 may be concentric and may rotate via bearing systems 138 about engine central longitudinal axis A-A'. As used herein, a "high pressure" compressor and/or turbine may experience a higher pressure than a corresponding "low pressure" compressor and/or turbine.

In various embodiments, the air along core airflow C may be compressed by low pressure compressor 144 and HPC 152, mixed and burned with fuel in combustor 156, and expanded over high pressure turbine 154 and low pressure turbine 146. Mid-turbine frame 157 may comprise airfoils 159 located in core airflow path C. Low pressure turbine 146 and high pressure turbine 154 may rotationally drive low speed spool 130 and high speed spool 132, respectively, in response to the expansion.

Figure 2A:
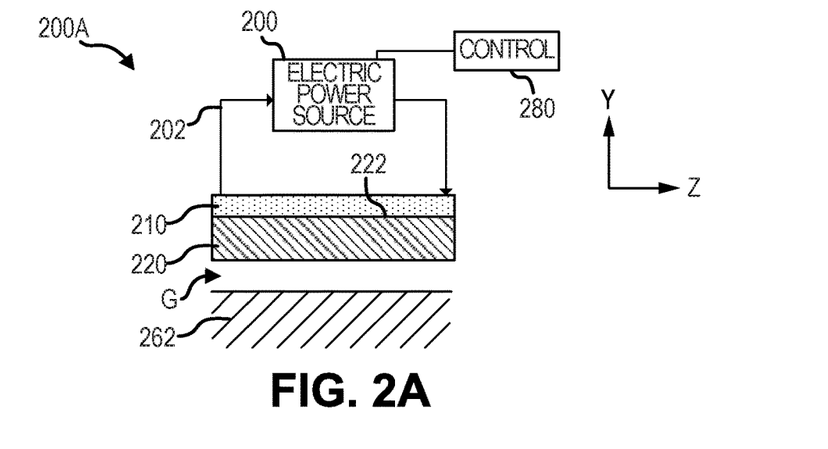
FIG. 2A illustrates a heating element coupled to an outer surface of an outer structure disposed radially outward from a blade for maintaining a blade tip clearance gap, in accordance with various embodiments.
Figure 2B:
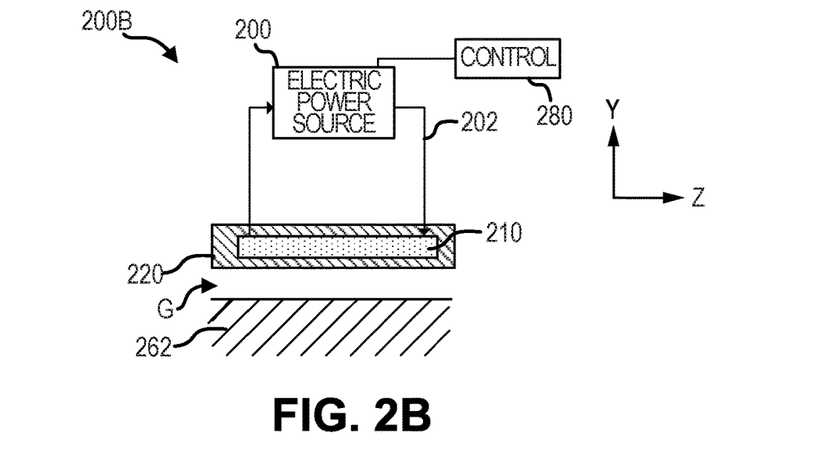
FIG. 2B illustrates a heating element embedded in an outer structure disposed radially outward from a blade for maintaining a blade tip clearance gap, in accordance with various embodiments.
Figure 2C:
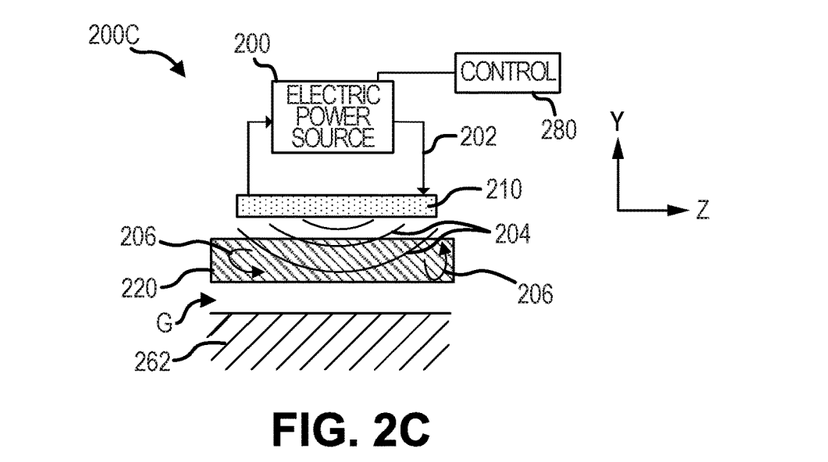
FIG. 2C illustrates a heating element spaced apart from an outer surface of an outer structure disposed radially outward from a blade for maintaining a blade tip clearance gap, in accordance with various embodiments.

With combined reference to FIG. 2A, FIG. 2B, and FIG. 2C, an outer structure 220 spaced by a clearance gap G from a radially outer tip of a rotating blade 262, is illustrated, in accordance with various embodiments. Outer structure 220 may generally surround rotating blade 262 in a hoop structure or a segmented hoop structure, as described herein in further detail. In various embodiments, outer structure 220 may be similar to control ring 66 as described with respect to FIG. 4A. In various embodiments, outer structure 220 may be similar to engine case 570 as described with respect to FIG. 5A. In various embodiments, the blade 262 is a component of the turbine section 128 as shown in FIG. 1. In various embodiments, the blade 262 is a component of the compressor section 124 as shown in FIG. 1.

A heating element is generally shown at 210. In various embodiments, the heating element 210 may be coupled to an outer surface 222 of outer structure 220 (FIG. 2A). Coupling the heating element 210 to an outer surface 222 may allow for ease of installation of the heating element 210 onto outer structure 220 as well as accessibility to the heating element 210 when installed on the outer structure 220 (e.g., for inspection, repair, and/or replacement).

In various embodiments, the heating element 210 is embedded in the outer structure 220 (FIG. 2B). Embedding the heating element 210 within the outer structure 220 may provide responsive, as well as evenly distributed, heating to the outer structure 220.

In various embodiments, the heating element 210 is spaced apart from the outer structure 220 (FIG. 2C). Spacing apart heating element 210 from the outer structure 220 may allow heating element 210 and outer structure 220 to move relative to each other without imparting mechanical stress therebetween (e.g., thermally induced stresses). Spacing apart heating element 210 from the outer structure 220 may be particularly useful for induction heating applications, as described herein.

The heating element 210 may be wired to an electric power source 200, for instance by way of wires 202 (i.e., leads, lead wires) on opposite sides of the heating element 210. Any appropriate type of arrangements may be used to allow a current supply through the heating element 210 from the electric power source 200. Electric power source 200 may also comprise multiple circuits for instance in parallel to heat up the heating element 210 in segments.

A processor, such as controller 280 may regulate electric power sent to heating element 210. Controller 280 may be implemented as a single controller or as multiple controllers. The controller 280 may be electrically coupled to at least one component of a gas turbine engine. The controller 280 may control the temperature of heating element 210 based upon an operating condition of the gas turbine engine to maintain blade tip clearance gap G. In various embodiments, controller 280 may control the temperature of heating element 210 based upon various operating conditions, including altitude, throttle position, rotor speed, and bleed pressure, among others.

In various embodiments, heating element 210 may cause outer structure 220 to increase in temperature via thermal conduction (interface heat transfer). Thus, heating element 210 may increase in temperature in response to an electrical current being passed there through, for instance a resistive heating element (e.g., Joule heating). In this regard, electric power source 200 may provide electric power to heating element 210, wherein in response to the electric power, heating element 210 increase in temperature and conductively transfers thermal energy to outer structure 220.

In various embodiments, with particular focus on FIG. 2C, heating element 210 may cause outer structure 220 to heat up via induction heating. Electric power source 200 may be configured to send alternating current (AC) to heating element 210, wherein in response to receiving the alternating current there through, an electric field, illustrated by lines at 204, is generated by heating element 210. The electric field 204 may penetrate outer structure 220, generating electric currents inside outer structure 220, referred to as eddy currents. The eddy currents, illustrated by lines at 206, flowing through outer structure 220 cause outer structure 220 to heat by Joule heating. Although, heat may also be generated by magnetic hysteresis losses. In this regard, heating element 210 may comprise an electromagnet. Heating element 210 may be made from an electrically conducting material, such as copper for example. Outer structure 220 may be made from an electrically conducting material, including metals such as iron, or an iron alloy, among others. Outer structure 220 may be made from a ferromagnetic material, such as iron for example.

Heating element 210 may cause outer structure 220 to heat up via induction heating when heating element 210 is in contact with outer structure 220 (see FIG. 2A and FIG. 2B) or when heating element 210 is spaced apart from outer structure 220 (see FIG. 2C).

In various embodiments, heating element 210 may comprise a wire, a coil, a hollow tube, a plate, or any other suitable heating element for Joule heating and/or induction heating.

In various embodiments, with combined reference to FIGS. 1 through FIG. 2C, heating element 210 may be powered after engine shutdown in order to prevent adverse effects of rotor bow in compressor section 124. Stated differently, heating element 210 may be powered after engine shutdown in order to prevent gap G from closing. Rotor bow, or thermal bowing, is typically due to asymmetrical cooling after shut-down on a previous flight. Differences in temperature across a shaft section, e.g. low speed spool 130 and/or high speed spool 132 the gas turbine engine supporting the rotor may lead to different thermal deformation of the shaft material, causing the rotor axis to bend. This results in an offset between the center of gravity of the bowed rotor and the bearing axis, causing a slight imbalance and potentially reducing the tight clearance between the rotor blade tips and the compressor wall, which can adversely affect engine performance.

Figure 3A:
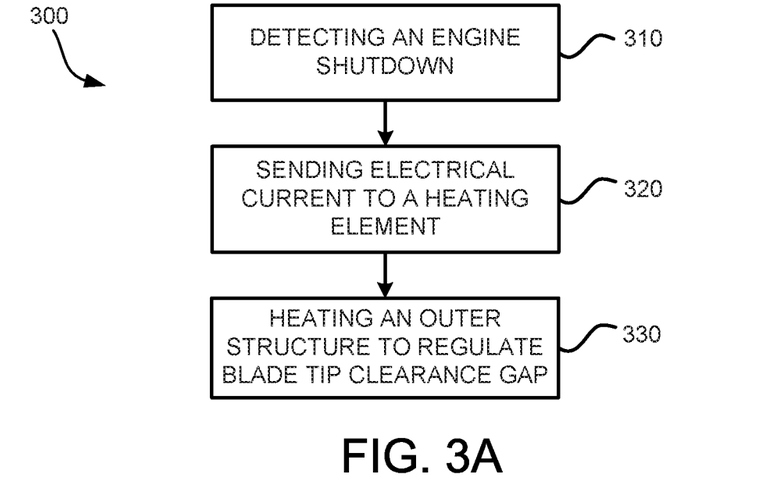
FIG. 3A shows a flow chart illustrating a method for controlling a heating element for a gas turbine engine to prevent adverse effects of thermal rotor bow, in accordance with various embodiments.

In this regard, with reference to FIG. 3A, a method 300 for controlling a heating element 210 for a gas turbine engine is illustrated, in accordance with various embodiments. Method 300 includes detecting an engine shutdown (step 310). Method 300 includes sending electrical current to a heating element (step 320). Method 300 includes heating an outer structure to regulate a blade tip clearance gap (step 330).

With combined reference to FIGS. 2A through FIG. 2D and FIG. 3A, step 310 may include detecting, by controller 280, a shutdown of gas turbine engine 120. Step 320 may include sending, by controller 280, electrical current to a heating element 210. Step 330 may include heating outer structure 220, via heating element 210, to maintain blade tip clearance gap G.

In accordance with various embodiments, in an active clearance control (ACC) system, air impinges on the turbine case when activated to cool and shrink the case diameter. This in turn reduces the diameter of the segmented blade outer air seal assembly. The seal body in this application is in segments to prevent thermal fighting between the seal and the turbine case to which the seal ultimately mounts to and which is a full hoop. The turbine case that comprises the full hoop structure is what controls the position of the blade outer air seal. Due to the mass of the turbine case and the thermal environment within which the turbine case operates, the turbine case is slow to respond thermally as the engine power level is increased. The turbine rotor diameter, however, will increase rapidly as the rotational speed and temperature of the engine increases. For this reason, extra clearance may be added between the tip of the blade and the blade outer air seal assembly to prevent rubbing contact between these two structures. However, this extra clearance can adversely affect engine performance.

In various embodiments, the present disclosure provides a system and method for mitigating the desire for an ACC system to reduce clearance gap G. Outer structure 220 and blade 262 may be configured such that under "cold" temperatures, e.g., during cruise, clearance gap G is minimal or at a desired dimension without the use of cooling air from an ACC system. In this regard, extra clearance is not added during manufacturing between the tip of the blade 262 and outer structure 220. Rather, blade tip clearance G is configured to be optimal at cruise conditions ("default closed") and heating element 210 is used to maintain clearance gap G in response to events that would otherwise cause blade tip strike, e.g. in response to a throttle acceleration.

Figure 3B:
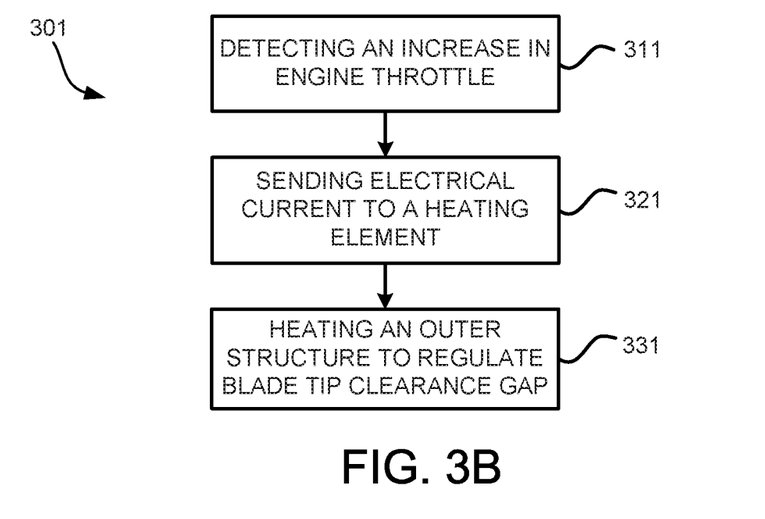
FIG. 3B shows a flow chart illustrating a method for controlling a heating element for a gas turbine engine to prevent rotor tip strike, in accordance with various embodiments.

In this regard, with reference to FIG. 3B, a method 301 for controlling a heating element 210 for a gas turbine engine is illustrated, in accordance with various embodiments. Method 300 includes detecting an increase in engine throttle (step 311). Method 300 includes sending electrical current to a heating element (step 321). Method 300 includes heating an outer structure to regulate a blade tip clearance gap (step 331).

With combined reference to FIGS. 2A through FIG. 2D and FIG. 3B, step 311 may include detecting, by controller 280, an increase in engine throttle of gas turbine engine 120. Step 321 may include sending, by controller 280, electrical current to a heating element 210. Step 331 may include heating outer structure 220, via heating element 210, to maintain blade tip clearance gap G.

Figure 2D:
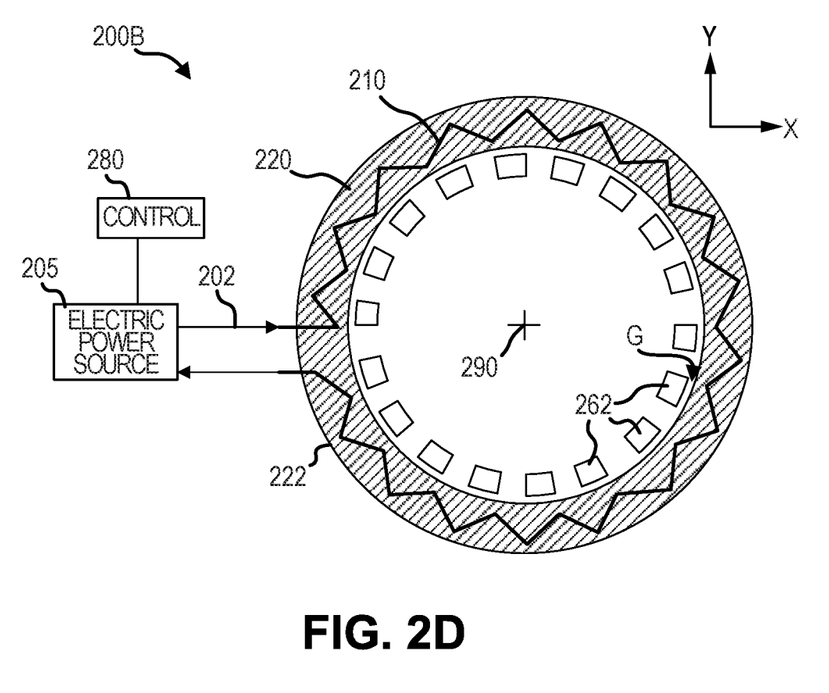
FIG. 2D illustrates a cross section axial view of a heating element embedded in an outer structure disposed radially outward from a blade for maintaining a blade tip clearance gap, in accordance with various embodiments.

With respect to FIG. 2D, elements with like element numbering, as depicted in FIG. 2B, are intended to be the same and will not necessarily be repeated for the sake of clarity.

With reference to FIG. 2D, a cross section axial view of clearance control system 200B is illustrated in accordance with various embodiments. Although illustrated as being embedded in outer structure 220, heating element 210 may be coupled to the outer surface of outer structure, similar to FIG. 2A, or may be spaced apart from outer structure 220, similar to FIG. 2C. Outer structure 220 may define an engine centerline axis 290. Outer structure 220 may surround a plurality of rotor blades 262. Rotor blades 262 may rotate about engine centerline axis 290 with respect to outer structure 220.

Figure 4A:
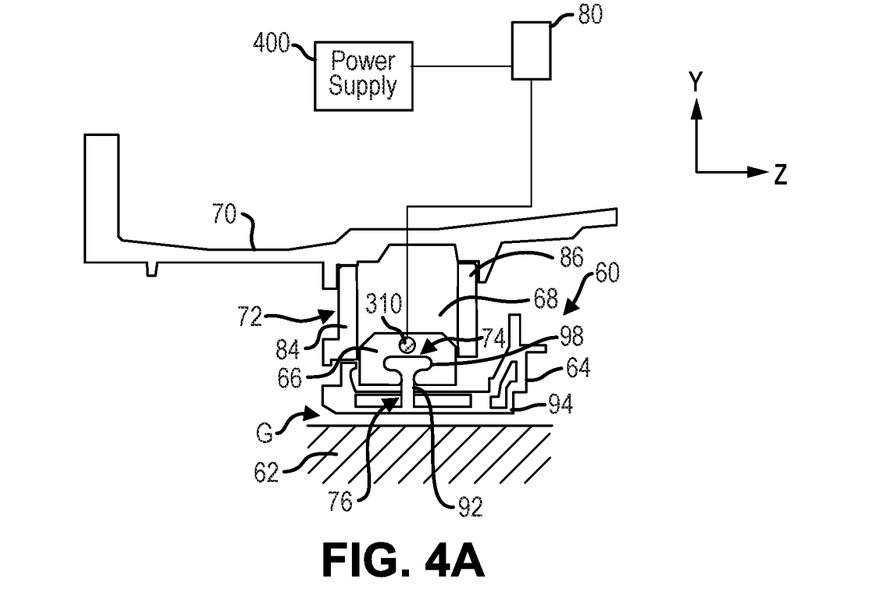
FIG. 4A and FIG. 4B illustrate a section view of a full hoop clearance control ring and a BOAS assembly positioned between a blade and an engine case and an active clearance control system for controlling a position of the BOAS via the clearance control ring, in accordance with various embodiments.

FIG. 4A illustrates an outer air seal assembly 60 spaced by a clearance gap G from a radially outer tip of a rotating blade 62. In various embodiments, the blade 62 is a component of the turbine section 128 as shown in FIG. 1. However, the outer air seal assembly 60 may be used in other engine configurations and/or locations, for example in the compressor sections. The outer air seal assembly 60 includes an outer air seal body 64 that is mounted to a clearance control ring 66. An internal cavity 68 is formed between an engine case 70 and the outer air seal assembly 60. A support structure 72 is associated with the engine case 70 to provide support for the outer air seal assembly 60.

Figure 6:
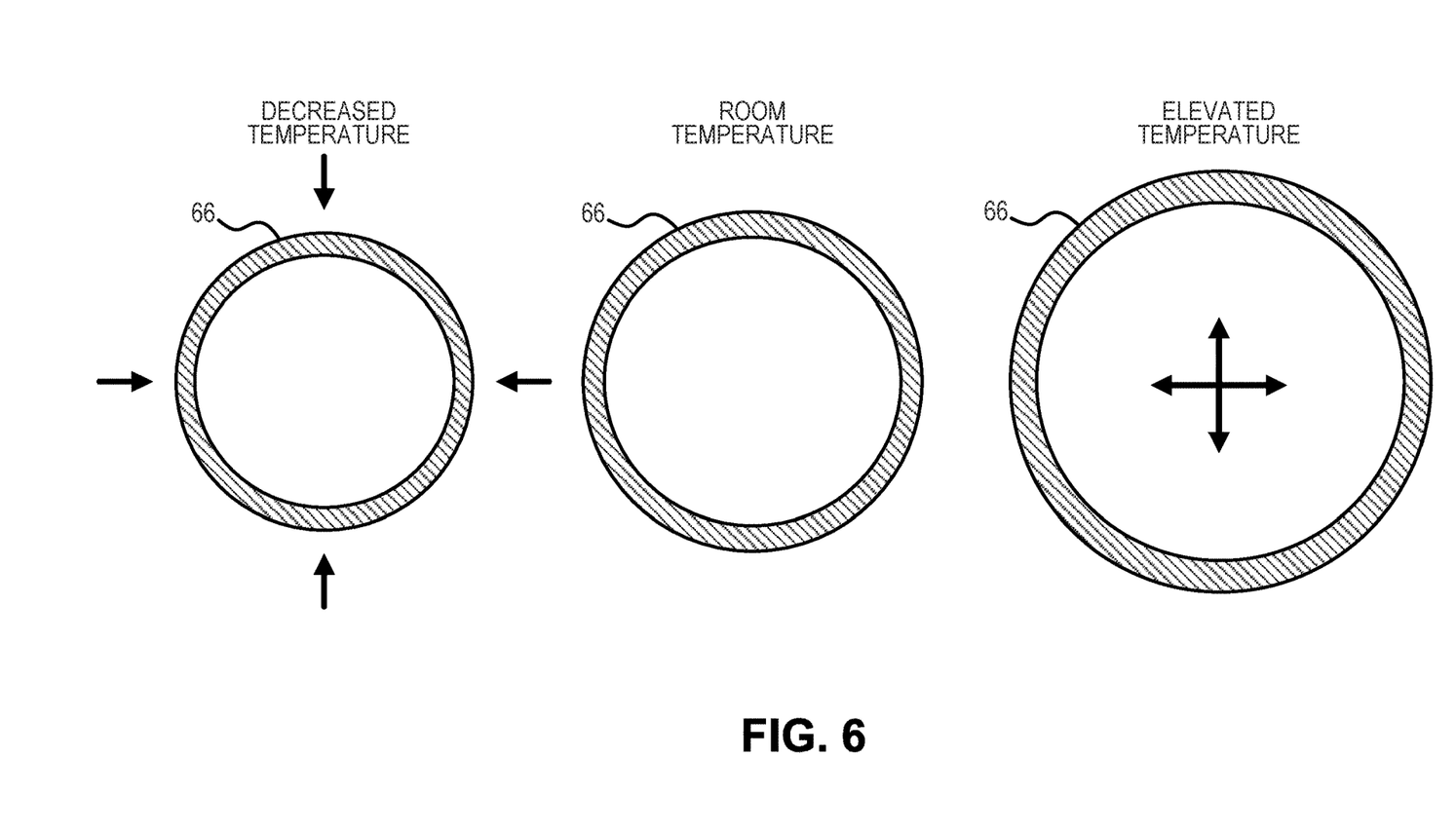
FIG. 6 shows an annular component (e.g., a clearance control ring or an engine case) at room temperature (middle), a decreased temperature (left), and an elevated temperature (right), in accordance with various embodiments.

The subject disclosure provides a configuration where the clearance control ring 66 is positioned adjacent the support structure 72 but is not directly tied to the engine case 70 or support structure 72. In various embodiments, clearance control ring 66 may be formed as an annular ring. In one example configuration, the clearance control ring 66 includes a first mount feature 74 and the seal body 64 includes a second mount feature 76 that cooperates with the first mount feature 74 such that the clearance control ring 66 can move within the internal cavity 68 independently of the support structure 72 and engine case 70 in response to changes in temperature. In one example, the clearance control ring 66 is a full hoop ring (i.e., annular) made from a material with a high thermal expansion coefficient, for example. For example, clearance control ring 66 may comprise a thermal expansion coefficient that is greater than that of engine case 70. For example, with momentary reference to FIG. 6, in accordance with various embodiments, clearance control ring 66 may grow in response to an increase in temperature and, in accordance with various embodiments, clearance control ring 66 may shrink in response to a decrease in temperature.

With continued reference to FIG. 4A, in various embodiments, the seal body 64 may include a ring mount portion 92. The clearance control ring 66 is radially moveable relative to the first 84 and second 86 radial wall portions in response to temperature changes via the connection interface to the ring mount portion 92. A main seal portion 94 extends from the ring mount portion 92 to face the blade 62.

In various embodiments, clearance control ring 66 may define a slot 98 to receive ring mount portion 92. In the example shown, the clearance control ring 66 includes the slot 98 and the seal body 64 includes the ring mount portion 92; however, the reverse configuration could also be used. In various embodiments, the slot 98 and the ring mount portion 92 comprise a key-shape, with each of the slot 98 and ring mount portion 92 having a first portion extending in a radial direction and a second portion extending in an axial direction. This type of configuration provides a floating connection interface that fully supports and properly locates the seal 64 while still controlling the seal 64 to move radially inwardly and outwardly as needed.

With continued reference to FIG. 4A, clearance control ring 66 may be similar to outer structure 220 of FIG. 2A, FIG. 2B, and/or FIG. 2C, in accordance with various embodiments. A heating element 310 may be configured to cause clearance control ring 66 to vary in temperature to cause clearance control ring 66 to move radially (Y-direction) within internal cavity 68 to maintain or vary clearance gap G. Heating element 310 may be similar to heating element 210 of FIG. 1A, FIG. 1B, and/or FIG. 1C, in accordance with various embodiments. In the illustrated embodiment, heating element 310 is embedded in clearance control ring 66; however, in various embodiments, heating element 310 may be coupled to an outer surface of clearance control ring 66, for instance similar to the illustrated embodiment of FIG. 2C, or may be spaced apart from clearance control ring 66, for instance similar to the illustrated embodiment of FIG. 2C. Control 80 may control the supply of electrical current from one or more power supplies 400 to heating element 80.

The illustrated configuration with the clearance control ring 66 may react faster than prior active control systems due to the reduced thermal mass and due to being exposed to air from the engine gaspath.

Figure 4B:
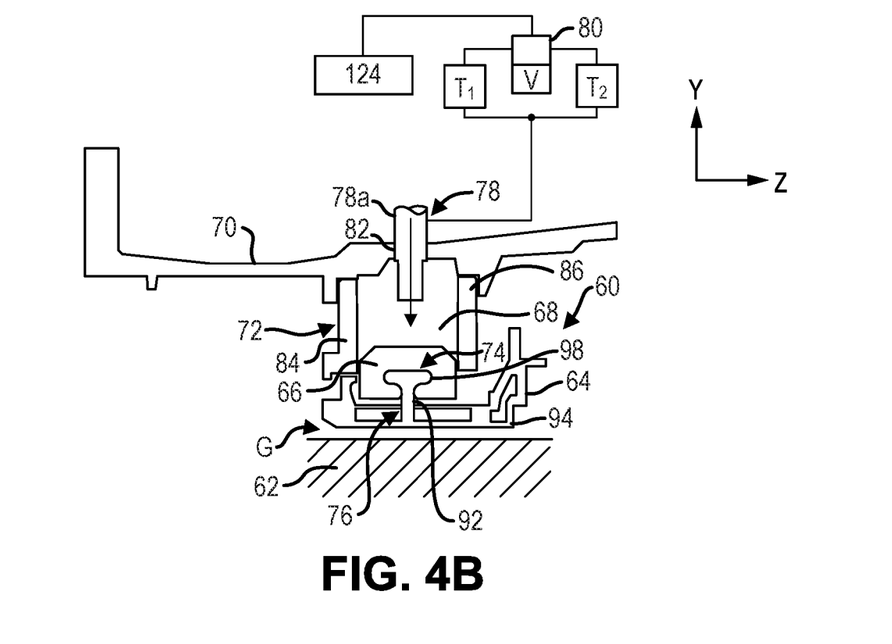

With reference to FIG. 4B, an injection source 78 may inject or deliver cooling fluid flow, for example, air flow, into the internal cavity 68 to control a temperature of the clearance control ring 66 to allow the outer air seal body 64 to move in a desired direction to maintain a desired clearance between the outer air seal body 64 and a tip of the blade 62, i.e. to control the size of the clearance gap G. In one example, the injection source 78 comprises a tube or conduit 78a that receives air flow from the compressor section 124 (FIG. 1) of the gas turbine engine. As shown in FIG. 4B, a control 80 is configured to deliver the compressor air at a first temperature T1 into the internal cavity 68 and against the clearance control ring 66 to allow the outer air seal body 64 to move in a first direction to maintain a desired clearance during a first operating condition, and is configured to deliver compressor air at a second temperature T2 into the internal cavity 68 and against the outer air seal body 64 to allow the outer air seal body 64 to move in a second direction to maintain a desired clearance during a second operating condition. In one example, the first operating condition comprises a takeoff or high load event, and the second operating condition comprises a descending event. In various embodiments, the first operating condition comprises a first throttle setting, and the second operating condition comprises a second throttle setting, the first throttle setting being greater than the second throttle setting.

In these example operating conditions, the second temperature T2 is less than the first temperature T1. In this example, the compressor air at the second temperature T2 can comprise cooled cooling air from the compressor exit while the air at the first temperature can comprise uncooled compressor exit air. The control 80 comprises a microprocessor and/or control unit that is programmed to deliver air flow at the first T1 or second T2 temperature as needed dependent upon the engine operating condition. The control 80 may further include valves V, flow conduits, and/or heat exchangers as needed to deliver the compressor air at the desired temperature. The control 80 delivers higher temperature air T1 into the cavity 68 when the clearance control ring 66 is to increase in diameter and delivers lower temperature air T2 into the cavity 68 when the clearance control ring 66 is to decrease in diameter. It should be understood that while two different temperatures are discussed as examples, the system is variable and the system can deliver fluid at any desired temperature.

The engine case 70 may include an opening 82 to receive the conduit 78a which directs compressor air into the cavity 68. The support structure 72 includes a first radial wall portion 84 extending radially inward from the engine case 70 and a second radial wall portion 86 axially spaced from the first radial wall portion 84 to define the internal cavity 68. The opening 82 may be positioned axially between the first 84 and second 86 radial portions. The engine case 70 includes trenches or grooves 88 adjacent to each of the first 84 and second 86 radial wall portions.

In various embodiments, heating element 310 may work in concert with injection source 78 to maintain clearance gap G, enabling two-directional clearance control and tighter running clearances as a result of smaller margins for maneuvers where outer seal assembly 60 would otherwise be too slow to expand. Heat caused by heating element 310 may cause outer seal body 64 to move in the radially outward direction (positive Y-direction, also referred to herein as a first direction). The cooling air flow supplied by injection source 78 may cause outer seal body 64 to move in the radially inward direction (negative Y-direction, also referred to herein as a second direction).

Figure 5A:
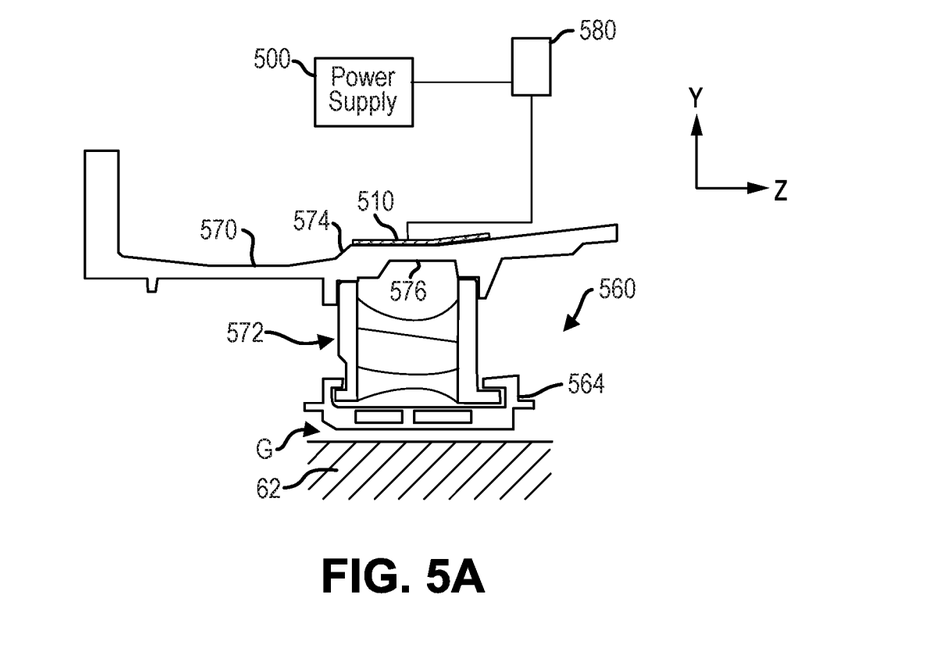
FIG. 5A and FIG. 5B illustrate a section view of a BOAS assembly positioned between a blade and an engine case and an active clearance control system for controlling a position of the BOAS via the engine case, in accordance with various embodiments.
Figure 5B:
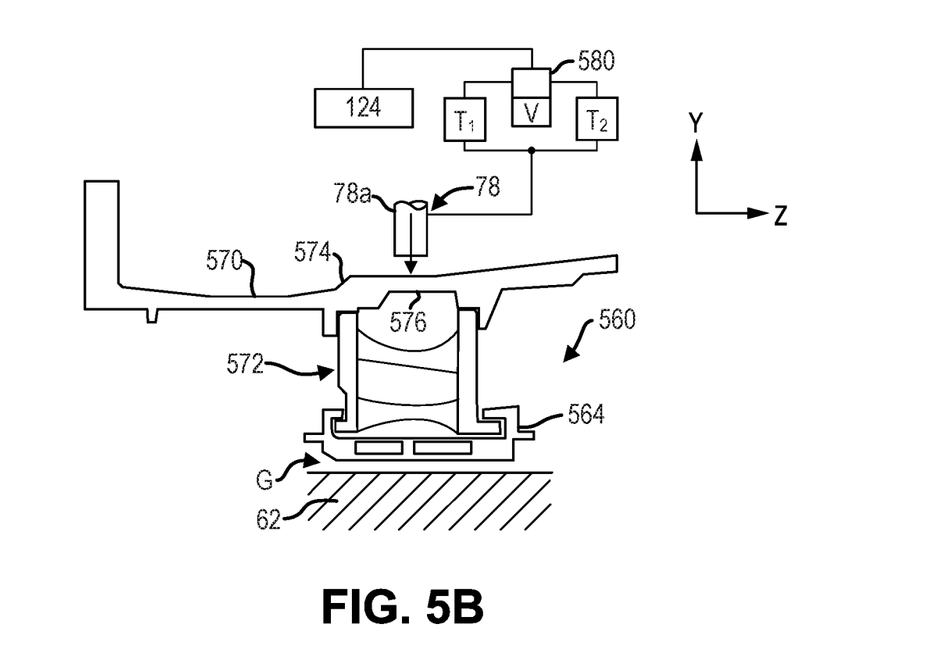

With respect to FIG. 5A and FIG. 5B, elements with like element numbering, as depicted in FIG. 4A and FIG. 4B, are intended to be the same and will not necessarily be repeated for the sake of clarity.

FIG. 5A illustrates an outer air seal assembly 560 spaced by a clearance gap G from a radially outer tip of a rotating blade 62. In various embodiments, the blade 62 is a component of the turbine section 128 as shown in FIG. 1. However, the outer air seal assembly 560 may be used in other engine configurations and/or locations, for example in the compressor sections. The outer air seal assembly 560 includes an outer air seal body 564 that is mounted to a support structure 572. The support structure 572 is associated with the engine case 570 to provide support for the outer air seal assembly 560. The outer air seal body 564 may be mounted to engine case 570 via support structure 572 and may move with engine case 570 in response to changes in temperature. For example, engine case 570 may grow or shrink in response to an increase or decrease, respectively, in temperature of the engine control case 570, similar to clearance control ring 66 (see FIG. 6).

Engine case 570 may be similar to outer structure 220 of FIG. 2A, FIG. 2B, and/or FIG. 2C, in accordance with various embodiments. A heating element 510 may be configured to cause engine case 570 to vary in temperature to cause engine case 570 to move radially (Y-direction) to maintain or vary clearance gap G. Heating element 510 may be similar to heating element 210 of FIG. 1A, FIG. 1B, and/or FIG. 1C, in accordance with various embodiments. In the illustrated embodiment, heating element 510 is coupled to a distal surface 574 of engine case 570; however, in various embodiments, heating element 510 may be coupled to the proximal surface 576 of engine case 570, may be embedded in engine case 570, for instance similar to the illustrated embodiment of FIG. 2B, or may be spaced apart from engine case 570, for instance similar to the illustrated embodiment of FIG. 2C. Control 580 may control the supply of electrical current from one or more power supplies 500 to heating element 80.

With reference to FIG. 5B, an injection source 578 may inject or deliver cooling fluid flow, for example, air flow, onto distal surface 574 of engine case 570 to cause the outer air seal body 564 to move in a desired direction to maintain a desired clearance between the outer air seal body 564 and a tip of the blade 62, i.e. to control the size of the clearance gap G. Injection source 578 may operate similarly as described with respect to injection source 78 of FIG. 4B. Stated differently, injection source 578 may be similar to injection source 78 of FIG. 4B, except that injection source 578 directs cooling fluid flow to engine case 570, instead of a clearance control ring.

In various embodiments, heating element 510 may work in concert with injection source 578 to maintain clearance gap G, enabling two-directional clearance control and tighter running clearances as a result of smaller margins for maneuvers where outer air seal assembly 560 would otherwise be too slow to expand.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine, comprising:
   an engine case;
   a rotor blade disposed within the engine case, the rotor blade configured to rotate about an engine centerline axis;
   an outer structure disposed radially outward from the rotor blade, wherein the outer structure comprises an outer air seal;
   at least one case support associated with the engine case, wherein the at least one case support extends radially inward from the engine case;
   a clearance control ring positioned adjacent the at least one case support to form an internal cavity between the engine case and the clearance control ring, and wherein the at least one case support provides support for the clearance control ring; and
   a heating element operatively coupled to the clearance control ring;

wherein the clearance control ring is mounted to the outer air seal such that the clearance control ring can move independently of the engine case;

in response to electric current being supplied to the heating element, the heating element causes the clearance control ring to be heated and, in response to the clearance control ring being heated, the clearance control ring and the outer air seal move together in a first direction with respect to the engine case and the at least one case support; and a volume of the internal cavity varies in response to the clearance control ring moving with respect to the engine case.

2. The gas turbine engine of claim 1, further comprising an injection nozzle configured to deliver a cooling air flow to the clearance control ring to cause the clearance control ring to move in a second direction.

3. The gas turbine engine of claim 1, further comprising:
an electric power supply configured to supply the electric current to the heating element; and
a controller configured to regulate the electric current being supplied to the heating element.

4. The gas turbine engine of claim 1, wherein the clearance control ring comprises a thermal expansion coefficient that is greater than that of the engine case.

5. The gas turbine engine of claim 1, wherein the at least one case support comprises:
a first radial wall extending radially inward from the engine case; and
a second radial wall extending radially inward from the engine case, wherein the clearance control ring is positioned axially between the first radial wall and the second radial wall.

6. The gas turbine engine of claim 1, wherein the heating element is coupled to an outer surface of the clearance control ring.

7. The gas turbine engine of claim 1, wherein the heating element is embedded in the clearance control ring.

8. The gas turbine engine of claim 1, wherein the clearance control ring is supported by the engine case such that the clearance control ring moves freely with respect to the engine case in at least the first direction.

9. A method for controlling blade tip clearance for a gas turbine engine, comprising:
detecting, by a controller, a condition of the gas turbine engine;
sending, by the controller, electric current to a heating element;
heating, by the heating element, a clearance control ring, wherein the clearance control ring is positioned adjacent at least one case support to form an internal cavity between an engine case and the clearance control ring, and wherein the clearance control ring is mounted to an outer air seal such that the clearance control ring can move independently of the engine case; and
moving the clearance control ring together with the outer air seal in a first direction with respect to the engine case and the at least one case support to maintain a gap between a rotor blade and the outer air seal,
wherein the at least one case support extends radially inward from the engine case, and the at least one case support provides support for the clearance control ring.

10. The method of claim 9, wherein the detecting the condition of the gas turbine engine comprises detecting an engine shutdown of the gas turbine engine.

11. The method of claim 9, wherein the detecting the condition of the gas turbine engine comprises detecting an increase in throttle of the gas turbine engine.

12. The method of claim 9, wherein the at least one case support comprises:
a first radial wall extending radially inward from the engine case; and
a second radial wall extending radially inward from the engine case, wherein the clearance control ring is positioned axially between the first radial wall and the second radial wall.

13. The method of claim 9, wherein the heating element is coupled to an outer surface of the clearance control ring.

14. The method of claim 9, wherein the heating element is embedded in the clearance control ring.

15. The method of claim 9, wherein the clearance control ring is supported by the engine case such that the clearance control ring moves freely with respect to the engine case in at least the first direction.

\* \* \* \* \*